Feb. 7, 1961 D. E. TICKNOR 2,971,067
AUTOMATIC EMERGENCY SIGNALING DEVICE FOR AUTOMOTIVE VEHICLES
Filed Jan. 21, 1958
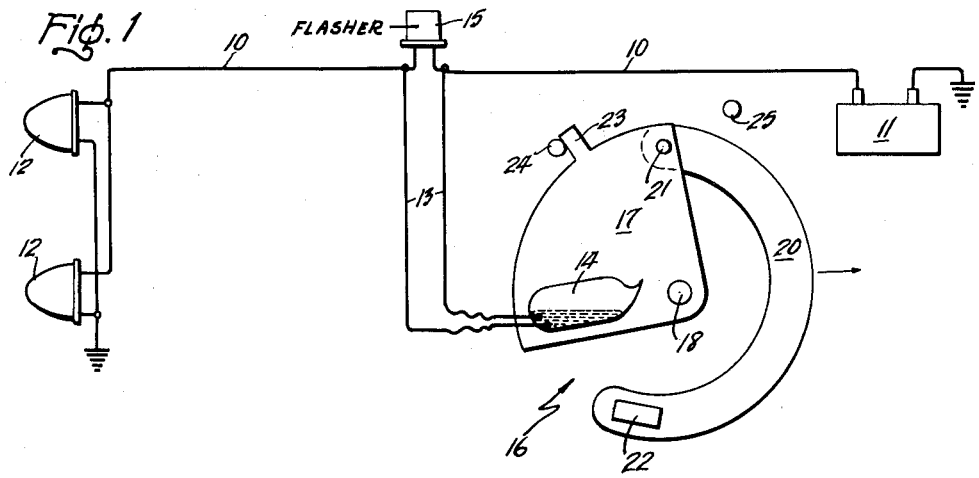
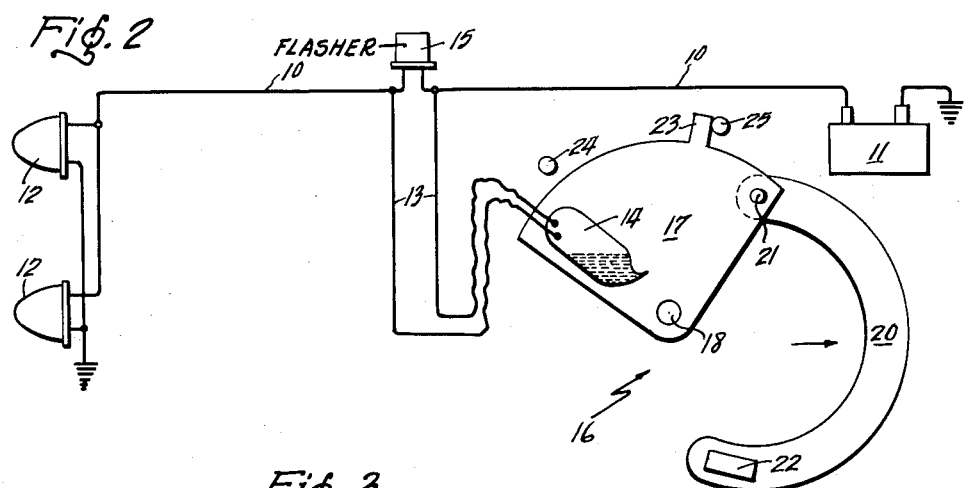
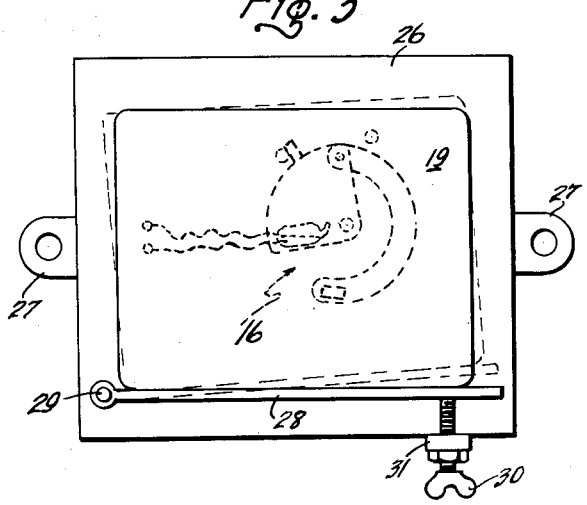
INVENTOR.
Donald E. Ticknor
BY Andros and Smith
His Attorneys

United States Patent Office 2,971,067
Patented Feb. 7, 1961

2,971,067

AUTOMATIC EMERGENCY SIGNALING DEVICE FOR AUTOMOTIVE VEHICLES

Donald E. Ticknor, 26 Point View Drive,
East Greenbush, N.Y.

Filed Jan. 21, 1958, Ser. No. 710,285

3 Claims. (Cl. 200—61.47)

This invention has to do with emergency stop light devices for automotive vehicles, having particular reference to such a device wherein the rear stop lights will normally remain steady when the vehicle is slowed down, or when the same is brought to a stop, but which, during rapid, sudden or abnormal deceleration of the vehicle, automatically causes such lights rapidly to blink or flash in order to alert drivers of oncoming vehicles approaching from the rear, and the provision of such a device is the principal object of the invention.

It is well known that with the present high speed thruways, freeways, turnpikes and the like, which more and more are beginning to criss-cross the country, rates of speed are permitted far in excess of those allowed on conventional highways and other roads. Very often, at night, or under adverse weather conditions, quick application of the brakes of the vehicle are necessary; or, even without the application of the brakes, such as, for example, when the driver, periodically, as one often does, removes his foot from the throttle, because of apparent bottlenecks, road blocks, sudden slowing down of preceding vehicles, or sudden side approaching, entering or exiting vehicles. There has, heretofore, been no warning to drivers to the rear, other than the steady conventional red rear lights, or such as are brought about by complicated mechanisms. Obviously, it would be a distinct improvement, and provide desirable new results if, under the foregoing conditions, a simple and positive device were available that instantly would provide for rapid automatic blinking or flashing upon substantially sudden deceleration of the vehicle as a warning and safety signal, without the necessity of the operator of such a vehicle attending to any task other than the normal driving procedure; or for him to be plagued with the need of seeking to operate any extraneous devices and diverting his eyes from the road, and this now is accomplished by means of the present invention.

Generally, therefore, it is an object of the invention to provide such a device that overcomes the foregoing difficulties and disadvantages, and which is simple, yet sturdy and durable of construction, economic of manufacture, which will operate in a positive manner, and which is relatively free from wear and tear, and other mechanical difficulties.

More specifically, it is an object of the invention to provide such a device having a switch in line circuit with the rear lights of the vehicle, which switch normally remains closed, a flasher unit also in line circuit with the lights and the switch that normally remains inoperative while the switch is closed, and means for mounting the switch adapted automatically to be moved upon substantial sudden deceleration of the vehicle in order to open the switch, thereby causing the flasher unit to be brought into operation intermittently to flash the lights until the mounting means for the switch restores the latter to its initial closed position.

Another specific object is the provision of such a device embodied by the foregoing in which an adjustable supporting means therefor is included comprising a base member adapted removably to be secured to the vehicle and a housing for the device.

Other specific objects of the invention are the provision of a mercury switch; a flasher unit that is of the low voltage type; a pivotally mounted member carrying the switch, preferably a sector plate having limit stop members thereon; a counterweight, preferably a weighted pendulum; and means to adjust the relative positions thereof to raise and lower the same in order to control the degree or moment of movement thereof.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention reference should be had to the following detailed description taken in connection with the accompanying drawing, in which:

Fig. 1 is an elevational view depicting a preferred embodiment of the device in its inoperative flashing position;

Fig. 2 is a view similar to that of Fig. 1 illustrating the device in its operative flashing position; and Fig. 3 is an elevational view of the device shown in dotted line position within an adjustable housing on a mounting base therefor.

Referring more particularly to the drawing, there is diagrammatically illustrated at 10 a line circuit between the vehicle battery 11 and the rear or tail lights 12.

In line circuit with the line 10 is shown a line 13 connected to a mercury switch 14 that normally remains closed under ordinary operating conditions of the vehicle as illustrated in Fig. 1.

Also in line circuit with the line 10 and the line 13 is a flasher unit 15 that normally remains inoperative while the switch 14 is closed, as shown in Fig. 1, but which is brought into operation as depicted in Fig. 2, as more fully will be explained hereinafter.

Indicated generally at 16 is the preferred type of structural arrangement on which the switch 14 is mounted, that is adapted automatically to be moved upon substantially sudden deceleration of the vehicle to open the switch circuit, thereby causing the flasher unit to be brought into operation intermittently to flash the lights 12 until such means is restored to initial position whereupon the switch 14 again automatically will be closed. Preferably such means includes a sector plate 17 that is pivotally mounted as at 18 in any suitable manner such as within the confines of a housing 19, as illustrated in Fig. 3. The switch 14 is properly secured in position at one end of the sector 17, and at the other end thereof is a pendulum 20, pivoted to the sector 17 as at 21 at one end, and carrying a weight 22 at the free end of the pendulum 20. On the arc of the sector 17 is a limit stop member 23 whose distance of travel is limited between the supplemental limit stop members 24 and 25 also preferably positioned within the housing 19 on one wall thereof.

Briefly, in operation, any sudden deceleration of the vehicle traveling in the direction shown by the arrows, that is, from left to right as shown in the drawing, under certain conditions such as those hereinbefore set forth, will result in a forward movement of the pendulum 20 as shown in Fig. 2. Consequently, the sector 17 will be pulled in the same direction around its pivot point 18 until the limit stop 23 comes in contact with the limit stop 25. The pendulum having pivoted about its pivot point 21 will, while it remains in suspended position, during such deceleration, hold the sector 17 in the indicated position, thereby opening the switch 14, sending the current through the low voltage flasher 15, which in turn will cause the lights 12 rapidly to blink or flash as a warning to oncoming vehicles in the rear. As soon as the vehicle again is accelerated, or even when brought to a stop, the sector 17 will be restored to its normal position, as shown in Fig. 1, thereby again closing the switch 14 to render the flasher 15 inoperative.

In Fig. 3 there is shown a base plate 26 having lugs 27 whereby the same can be secured to a vehicle in any selected position. The housing 19 is mounted on an arm 28 pivoted at 29 to the base plate 16. A thumbscrew 30 passing through lug 31 on the base plate 26 abuts the arm 28, whereby the housing 19 can be made to rise or fall in order selectively to control, or set for any desired operation, the action or moment of the pendulum and sector within the housing.

It will thus be seen that the objects hereinbefore set forth may readily and efficiently be obtained and since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In a deceleration signal device for a vehicle, a housing, a pivot pin in said housing, a plate pivotally mounted at its lower end on said pin to rotate through a predetermined arc therein, spaced stop members within said housing to determine the degree of rotation of said plate, a switch carried by said plate and adapted to be connected with a low voltage flasher in line circuit with stop lights for said vehicle, a freely swingable pendulum pivotally mounted on said plate above said pin to rotate said plate against one of said stop members to maintain said switch in closed position but to rotate said plate against said other stop member to open said switch upon sudden deceleration of said vehicle and to restore said switch to said closed position when said deceleration ceases.

2. In a deceleration signal device for a vehicle, a housing, a pivot pin therein, a plate pivotally mounted at its lower end on said pin within said housing to rotate through a predetermined arc therein, a limit stop member on said plate spaced from said pivot pin, spaced-apart first and second stop elements in the path of said limit stop member, a switch carried by said plate, a weight pivotally suspended from said plate from a point above said pin to a point therebelow to rotate said plate to close said switch when said limit stop contacts said first stop element and, upon sudden deceleration of said vehicle, to rotate said plate in an opposite direction to open said switch and to hold said limit stop against said second stop element until said deceleration ceases and thereupon to restore said switch to said closed position.

3. In a device of the character described for a vehicle comprising a housing, a pivot pin in said housing, a plate pivotally mounted at its lower end on said pin to rotate through a predetermined arc, a switch carried by said plate, a pendulum pivotally mounted on said plate to rotate said plate to hold said switch in closed positon but upon deceleration of said vehicle to rotate said plate in an opposite direction to open said switch until deceleration ceases and to restore said switch to closed position; a mounting base for said housing and movably mounting the same thereon; and means for adjusting the position of said housing to adjust the degree of movement of said plate and pendulum.

References Cited in the file of this patent

UNITED STATES PATENTS

| | | |
|---|---|---|
| 2,453,783 | Claypool | Nov. 16, 1948 |
| 2,586,685 | McNerney | Feb. 19, 1952 |
| 2,666,870 | Levy | Jan. 19, 1954 |
| 2,748,218 | Leichsenring | May 29, 1956 |
| 2,751,575 | Jacobs et al. | June 19, 1956 |

FOREIGN PATENTS

| | | |
|---|---|---|
| 849,663 | Germany | Sept. 18, 1948 |